United States Patent
Krause

(10) Patent No.: US 11,321,791 B1
(45) Date of Patent: May 3, 2022

(54) COMPREHENSIVE CONSTRUCTION PROJECT MANAGEMENT SYSTEM AND PLATFORM

(71) Applicant: Richard A. Krause, Arlington Heights, IL (US)

(72) Inventor: Richard A. Krause, Arlington Heights, IL (US)

( * ) Notice: Subject to any disclaimer, the term of this patent is extended or adjusted under 35 U.S.C. 154(b) by 0 days.

(21) Appl. No.: 17/133,714

(22) Filed: Dec. 24, 2020

Related U.S. Application Data

(60) Provisional application No. 63/015,927, filed on Apr. 27, 2020, provisional application No. 63/086,441, filed on Oct. 1, 2020, provisional application No. 63/094,963, filed on Oct. 22, 2020, provisional application No. 63/108,478, filed on Nov. 2, 2020, (Continued)

(51) Int. Cl.
| | |
|---|---|
| *G06Q 50/08* | (2012.01) |
| *G06Q 10/10* | (2012.01) |
| *G06Q 10/06* | (2012.01) |
| *G06F 30/13* | (2020.01) |
| *G06Q 50/18* | (2012.01) |
| *G06Q 40/00* | (2012.01) |
| *G06Q 10/08* | (2012.01) |
| *G06Q 30/00* | (2012.01) |
| *G06Q 30/08* | (2012.01) |

(52) U.S. Cl.
CPC ............ *G06Q 50/08* (2013.01); *G06F 30/13* (2020.01); *G06Q 10/06312* (2013.01); *G06Q 10/06313* (2013.01); *G06Q 10/0875* (2013.01); *G06Q 10/101* (2013.01); *G06Q 10/103* (2013.01); *G06Q 30/018* (2013.01); *G06Q 30/08* (2013.01); *G06Q 40/12* (2013.12); *G06Q 50/18* (2013.01)

(58) Field of Classification Search
CPC .... G06Q 50/08; G06Q 10/101; G06Q 10/103; G06Q 10/06313; G06Q 10/06312; G06Q 50/18; G06Q 40/12; G06Q 10/0875; G06Q 30/018; G06Q 30/08; G06Q 20/382; G06F 30/13
USPC .......................................................... 705/50
See application file for complete search history.

(56) References Cited

U.S. PATENT DOCUMENTS 10,831,944 B1 * 11/2020 Giattina ................. G06Q 50/08

* cited by examiner

*Primary Examiner* — Allen C Chein
*Assistant Examiner* — Denisse Y Ortiz Roman
(74) *Attorney, Agent, or Firm* — Christopher J. Scott

(57) ABSTRACT

A computer-implemented, multi-modular, software-based construction project management system facilitates comprehensive construction project management from design to build completion stages. The management system provides a platform to network a series of computer clients for implementing a series of non-transitory, computer-implementable modules, including a first Design Input Conversion & Management module, a second Project Survey, Code Match & Organize module, a third Scheduling module, a fourth Vendor Selection & Bid Process module, a fifth Total Cost, Bid Evaluations & Contract Finalization module, a sixth Project Assembly & Quality Verification module, and a seventh Financial Accounting & Transactions module. Together the system-supportive modules operate to continually advance a construction project as initiated by design component data input into the system via the Design Input Conversion & Management module from an outside source provider and converted for use throughout the system as the project advances to completion.

20 Claims, 10 Drawing Sheets

AUTOBUILD 2020

Related U.S. Application Data provisional application No. 63/117,040, filed on Nov. 23, 2020, provisional application No. 63/117,043, filed on Nov. 23, 2020.

AUTOBUILD 2020

Module B
Design Input Conversion & Management

Module C
Project Data Survey, Code Match & Organize

Module D Scheduling

Module E
Vendor Selection & Bid Process

Module G
Project Assembly & Quality Verification

US 11,321,791 B1

COMPREHENSIVE CONSTRUCTION PROJECT MANAGEMENT SYSTEM AND PLATFORM

BACKGROUND OF THE INVENTION

Prior History

This application claims the benefit of U.S. Provisional Patent Application No. 63/015,927 filed in the United States Patent and Trademark Office (USPTO) on 27 Apr. 2020; U.S. Provisional Patent Application No. 63/086,441 filed in the USPTO on 1 Oct. 2020; U.S. Provisional Patent Application No. 63/094,963 filed in the USPTO on 22 Oct. 2020; US Provisional Patent Application No. 63/108,478 filed in the USPTO 2 Nov. 2020; U.S. Provisional Patent Application No. 63/117,040 filed in the USPTO 23 Nov. 2020; and U.S. Provisional Patent Application No. 63/117,043 filed in the USPTO 23 Nov. 2020, the specifications and drawings of which provisional applications are hereby incorporated by reference thereto.

Field of the Invention

The present invention generally relates to a system for managing a construction project, and more particularly relates to a computer-driven system, platform and associated methods for comprehensively managing all aspects of a construction project from initial design input to final construction build.

Brief Description of the Prior Art

US Patent Application Publication No. 2020/0151937, authored by Miller ('937 Publication), discloses a Method and System for Construction Project Management Using Photo Imaging Measurements. The '937 Publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials, invoices, and receipts for the necessary tools and materials required by the construction project.

US Patent Application Publication No. 2020/0027043, authored by Agassi, et al. ('043 Publication), discloses a Construction Project Management System and Method Thereof. The '043 Publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 Publication), discloses a Construction Management System, Construction Management Method, and Management Device. The '153 Publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 Publication), discloses a Method for Integrated Management Including Building Construction and Maintenance Based on Video. The '843 Publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 Publication), discloses a Cloud-Based System for Collaborating Engineering, Operations, Maintenance, Project Management, Procurement, and Vendor Data and Activities. The '102 Publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 Publication), discloses a System for On-Site Tracking, Managing, Planning and Staging Construction Projects. The '225 Publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 Publication), discloses a Construction Management System and Method. The '156 Publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 Publication), discloses certain Construction Project Management Systems and Methods. The '250 Publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 Publication), describes a Construction Management System and Method for Linking Data to a Building Information Model. The '037 Publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,593,104 issued to Robert, et al. ('104 Patent), discloses certain Systems and Methods for Generating Time Discreet 3D Scenes. The '104 Patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata.

Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component date into a standardized format for use by a plurality of interconnected system-supportive, software-based modules to advance the initial design component data from design concept to final build all within a system of full or near-full automation. What follows is a summary of the present invention as described in more detail following the prefatory summary.

SUMMARY OF THE INVENTION

The present invention ultimately derives from a perceived need in the construction industry to find and develop industry professionals having sufficient experience and training with intimate details and hands-on experience in connection with the various aspects of the construction process so as to be considered "Master Builders". Those highly skilled in the construction industry readily understand that the construction process, from initial design and preliminary estimates to full assembly or final build completion, involves a significant number of events, and if not properly managed, serious errors can often occur. More particularly, if the lead project coordinator or manager does not competently understand or have a sufficient grasp of the entire build intent in all its finer detail, his or her lead through the project will often falter and problems will often arise. This produces higher costs, broken budgets, major schedule delays, etc.

The present specifications ultimately derive from the author's firsthand experience with the construction industry beginning at a relatively early age and matured from a combination of curiosity and perfectionistic thinking, along with strong personal independence from that early age. At age nine, the author stripped forms and shoveled pea gravel for a concrete foundation contractor, then witnessing how each step of the process was performed. At age ten, the author bent conduit and pulled wire, and learned the basics of how to install electrical systems from scratch within single family homes. At age eleven, the author worked as a carpenter, building homes, and at age twelve, basic plumbing and masonry work was incorporated into the author's work routine.

By the time the author turned thirteen, he was finishing neighborhood basements after having completed a showcase project for his best friend's parents. At age fifteen, the author was adding members to his crew to stay abreast with the demand and time constraints in view of school and extracurricular activities. This early crew and business was maintained through high school and his early college years. Early college level construction management coursework, however, proved too basic given the author's firsthand experience in the industry and a shift in focus was then made toward structural engineering.

After graduating from college, the author was employed by a small-to-midsize construction company that, at the time, that was doing approximately $30 million in sales a year. Because of the author's background and comprehensive ability to properly estimate all trades on a project, and understand competitor weaknesses, staffing, materials procurement, CPM scheduling, coordinating subcontractors and constructing a project to completion, the author grew through the company relatively quickly, becoming one of a handful of members that helped grow the company around the country, with sales approaching $4 billion by the time the author started his own construction company.

This background of the author is not meant whatsoever to impress, but to illustrate how a person truly skilled in the construction industry will typically develop such a skill set from an early beginning by way of childhood curiosity; skills learned at an early age thereby become "second nature". This "second nature" skill set development is often one of the commonalities of successful people in all professions and industries. In other words, the strengths that have made these individuals successful are often tied to what happened to them during their early years of development. Nowadays, youth are most often working electronically from their chairs. The hands-on experience gained from physically and visually connecting elements particularly in the construction industry has significantly faded with the proliferation of technological digitalization.

This loss of elemental knowledge in the construction industry appears to be creating poorly coordinated support documents, designs, and plans that have not been thoroughly thought through in the author's opinion. In turn, the poorly coordinated support documents, designs, and plans produce conflicts and incompatible connections that are not understood on the project until a later stage, at which point costly corrective action(s) must be taken to remedy or correct the pitfalls. The late stage problem-solving can be chaotic and sabotage a project, drastically increasing costs and causing delays in completing the project.

Well over a century ago the expression, "Master Builder" was coined. A so-called Master Builder was an individual, although rare even back then, that envisioned and understood the intimate details of the project from the initial design through every part and piece of the complete construction assembly. When the term was first coined, there were fewer choices of materials and construction methods so it may have been a bit easier for someone to comprehend all that was involved. Notably, Daniel Burnham is an example of an individual who possessed this talent and was considered a "Master Builder" with whom the author closely identifies.

Current frustrations in the construction industry stem from the difficult or near impossible task of finding those rare individuals who are able to receive a project's initial design and price and build each element conceptually before construction starts, and then preplan and layout the entire process for all others to follow in a way that produces a smooth uninterrupted process so critical to a successful project.

To help remedy these shortcomings, the author often finds himself giving advice to the estimating and project management teams to lock themselves in a room for two to four days without interruption to read every note and review every detail of the drawings and specifications. An instruction is then provided to build a job conceptually, including every element, as if each participant were the only human being on earth digging, assembling, and connecting each piece of material and equipment of the project down to its screws, nails and adhesives. When questions arise, the apprentices should enquire of their mentors. Although this process is preached, it is difficult even for the most talented and well-educated individuals to truly perform comprehensively.

There is thus a perceived need in the construction industry to formulate and provide a comprehensive, digitalized, construction project management system operable not only to harness state of the art technology, but to further provide a system that anticipates further industry innovations in such a manner that works the details to almost perfection and guides a smooth completion of the entire construction project process. In order to properly provide such a comprehensive system, each step of the process need to be accurate, comprehensive and reliable. Moreover, the systemic brains and management functions of the system must be able to contemplate the role of all the various parts and how they interact with each other. The process also necessarily requires communications with real world inputs as derived from humanistic characteristics that exist today to the extent that a human can engage in an overview and assure that the process is working smoothly and on a reliable path.

To achieve these ends, the comprehensive construction project management system according to the present invention contemplates two primary objectives. Firstly, the present invention provides a data conversion system and an overall operating system or platform for supporting and allowing communication, orchestration, pricing, scheduling, contracting, procuring, delivering, constructing, tracking, and management of an entire construction project build within a system of automation.

Secondly, the present invention contemplates a number of individual platform-supportive software driven modules that together cooperate to provide the comprehensive Overall Operating System or AUTOBUILD 2020 system or platform referenced above, each of which are unique to the current market, but built to cooperate with peripheral fields of industry-supportive art so that the management system according to the present invention develops in parallel with technological advances in the construction industry.

In this regard, the present invention is designed to cooperate with its own and other developments in the field as technology advances independently of the present invention. Outside technological advances may then tie into the present invention, denoted as the AUTOBUILD 2020 System, and enhance the AUTOBUILD 2020 System according to the present invention while at the same time being operable to enhance those independent outside or peripheral technologies.

Thus, the objectives of the present invention are basically the provision of a comprehensive construction project management system comprising multiple systemic software-based modules, each of which comprise a series of platform-supportive software-driven nodes and associated methodology that firstly operates to receive facility or structural design input from a designer and converts the facility or structural design input as received from the designer into a system that comprehensively implements the design into a full build.

The AUTOBUILD 2020 construction project management system according to the present invention enables communication within, orchestration of, tracking throughout, and manage of the entire construction process from the initial provision of facility construction estimates and pricing, to scheduling, contracting, materials procurement and delivery, and facility build in a system of full or near-full automation. To provide this functionality, the AUTOBUILD 2020 system first receives a completed or partially completed Design of a facility or structure (herein referred to as a Design Component) and converts the Design Component into the AUTOBUILD 2020 automation system comprising a series of software-based, platform-supportive Modules (i.e. Modules B-H as summarized in more detail below).

Conceivably, the initial design input or Design Component is provided by an architect or engineer (A/E) who has assembled the facility's needs and programming and has completed some usable input in the form of a conceptual design or completed construction documents in a state of the usable formatting (e.g. AutoCAD or AuToDESK® Revit). The AUTOBUILD 2020 system then converts the design intent/input into an electronic file that manages and/or governs the entire construction process of the facility or structure as detailed in the initial design input data. The following narrative describes how the system operates as derived from an exemplary AuToDESK® Revit file for ease of understanding.

The present invention is operable from input from (Auto-CAD or) AuToDESK® Revit input data or similar other input data that offers facility or building information modelling for architects, landscape architects, structural engineers, mechanical, electrical, and plumbing engineers, designers and contractors. Software that allows users to design a facility or building or structure and its components in a three-dimensional (3D) model, annotate the 3D model with two-dimensional drafting elements, and access building information from the building model's database.

AuToDESK® Revit, as an exemplary software tool, may be said to provide a four-dimensional or 4D building information modeling with tools to plan and track various stages in the building's lifecycle, from concept to construction and later maintenance and/or demolition. The present invention builds upon this core functionality to not only plan and track various stages of a building lifecycle, but to also govern constructional aspects of the project by way of a number of interconnected systemic software-based modules that together operate to provide a comprehensive construction project management system according to the present invention.

A first systemic module according to the present invention is a Design Input Conversion & Management Module denoted or referenced at Module B. The Design Input Conversion & Management Module B is a sub-system or software-based systemic component that performs data conversion of the initial design data or Design Component as input into Module B, including initial data traffic management. The data conversion provided by the Design Input Conversion & Management Module B provides data formatting for tracking, calculating, managing, and communicating multiple aspects of the construction project for enabling successor or peripheral modules to successfully carry out their functions.

A second systemic module according to the present invention is a Project Data Survey, Code Match & Organize Module denoted or referenced at Module C. The Project Data Survey, Code Match & Organize Module C according to the present invention codes and quantifies each and every specific piece or element of material and equipment needed to complete the project. The coding and quantification module further summarizes material and equipment requirements into a cost estimate summary.

To achieve this, the Project Data Survey, Code Match & Organize Module C receives information from the Design Input Conversion & Management Module B and codes every component of the finished product from micro-assembly materials such as screws, adhesives, and other types of fasteners that are needed to macro-assembly materials such as structural steel, Heating, Ventilation, & Air-Conditioning (HVAC) components and electrical types of material and equipment required to complete the building.

The Project Data Survey, Code Match & Organize Module C quantifies all the parts and pieces of the proposed building and organizes the information into a system that produces a line-item cost accounting that is further utilized to track every component of the project. This allows each component to be costed, contracted, procured, tracked, and delivered to the jobsite as required. This component also alerts the architect to any missing information including finer item details required for the project exemplified by missing fasteners, a specification for a particular adhesive that is required, and/or requirements for missing flashing that could cause water infiltration.

The Project Data Survey, Code Match & Organize Module C provides a central role in support of the present invention insofar as its provision of anticipatory planning for eliminating conflicts, delays, and last-minute missing details that often delay projects and increase costs. This module further partially manages initial stage quality control and coordinates with on-site monitoring systems to confirm that the components directed into the project are per the specifications as designed. In this regard, the system contemplates requiring the architect/designer or A/E to specify each individual component from a built-in catalog and provides a coding system for allowing the architect/designer or A/E to select options from those materials that are compatible with the design intent with built-in flexibility for allowing bidding contractors to select from more than one option if desired.

A third module according to the present invention is a Scheduling Module as denoted or referenced at Module D. The Scheduling Module D provides a preliminary schedule at the onset of the project. The preliminary schedule is then updated and more fully developed as data input from other nodes or modules communicate with the Scheduling Module D until the final approval signoff takes place produced by acknowledgement points (confirmed by material and equipment supply confirmations, subcontractor commitments, project management confirmations, owner feedback, etc.) that are compiled for confirming a final schedule.

Once the final schedule is confirmed, the Scheduling Module D tracks the entire project in real time, documenting actual build events throughout the progress of the entire project. Communications are exchanged between nodes that procure, track material fabrication, construct, and manage the actual on-site activities. Collaborated progress data is input to the Scheduling Module D for providing current schedule updates in real time. The Scheduling Module D further provides a daily report describing the current status of the project in comparison to the originally planned final schedule. The Scheduling Module D also manages the procurement process which is highly critical to all projects, including the bid process, subcontract, material, and equipment commitments, and exemplary shop-drawing approval, fabrication, and delivery to site processes.

A fourth module according to the present invention is a Vendor Selection & Bid Process Module denoted or referenced at Module E. The Vendor Selection & Bid Process Module E is used to create a vendor/subcontractor database based on criteria such as financial soundness, capability, capacity, and performance history. The Vendor Selection & Bid Process Module E is also used to select vendors and/or subcontractors/suppliers according to best fit criteria for a given project based on a number of select parameters.

In other words, when the Vendor Selection & Bid Process Module E is activated, the module operates to solicit select subcontractors and suppliers to provide cost proposals for the project and to secure confirmations that select subcontractors and suppliers can meet schedule guidelines and the project requirements. The Vendor Selection & Bid Process Module E continually monitors subcontractor and/or supplier performance on any given project through pre-determined periods of time and provides a rating system that operates to reinforce the initial prequalification process. This module requires subcontractors and suppliers to candidly provide accurate information on select vendors so that those vendors can also be monitored by way of the module.

A fifth module according to the present invention is a Total Cost, Bid Evaluations & Contract Finalization Module denoted or referenced at Module F. The Total Cost, Bid Evaluations & Contract Finalization Module F gathers and summarizes the total estimated cost of the project and organizes this information in a detailed line-item format. This module matches and confirms the quantity and types of materials/equipment that are being provided by each of the vendors providing quotations and it compares those to the built-in material cost and manhour production estimates internal to the present invention thereby providing a check and balance for overall cost accuracy.

This module assesses project completion progress, bidder irregularities, bidder exceptions, exclusions, qualifications, etc. and provides a reliable Bid Compare Process resulting in best fit, reliable vendors to be selected to entry into mutual contractual commitments. Conceivably, this aspect of the module preferably requires at least occasional human interaction for providing manual approval events. In other words, a user or general contractor team, project owner, and/or design entity may manually approve the line-item summary in order to proceed to the next steps of entering into contractual commitments and commencement of the procurement and construction process.

The Total Cost, Bid Evaluations & Contract Finalization Module F further provides functionality for facilitating any necessary modifications to the building design, including value engineering exercises for adjusting the design and specifications. With the recommended design modification suggestions automatically generated from the management system according to the present invention and/or the human team, the system can be rerun developing a new revised total cost summary based on the changes prior to entering into contractual commitments.

A sixth module according to the present invention is a Project Assembly and Quality Verification Module denoted or referenced at Module G. The Project Assembly and Quality Verification Module G activates and governs the physical build of the project on the selected site, monitoring the real-time step-by-step sequence and progress as each component is injected into the project. This module includes visual monitoring aids exemplified by video cameras, GPS systems, drones equipped with proper equipment, robotic equipment, etc. These visual monitoring aids work and communicate with other modules and nodes that create a first brain of the system providing constant feedback and status in order for the other parts of the system to give direction on each step to follow and make adjustments if required.

This monitoring system shall be connected to all vendors and managers providing information and requiring response and/or action by tracking and giving feedback on deliveries, logistics, schedule, assembly coordination, next successor activity notifications, quality of workmanship, etc. Although this module is mostly used in the commencement of the actual physical construction of the project, it is used to evaluate, measure, and analyze the existing site conditions in order to finalize the design of the project particularly for foundation and site work purposes.

This system operates within a three-dimensional spectrum and provides control on all three axes to the accuracy of approximately ¼ inch. This module comprises five stages, including the following:

Stage No. 1: project site survey, subsurface evaluation, site work and site utility evaluation, cut and fill of import and export materials, etc.

Stage No. 2: Set-up of GPS three-dimensional project control.

Stage No. 3: management of order of sequence of each individual component.

Stage No. 4: verification of materials and equipment delivered to jobsite and being of the correct type and size.

Stage No. 5: step-by-step verification of each component installed and installed correctly and in the correct location.

A seventh module according to the present invention is a Financial Accounting & Transactions (Accounts Receivable/Accounts Payable (AR/AP)) Module denoted or referenced at Module H. The Financial Accounting & Transactions Module H maintains and manages all financial transactions including accounts payable and accounts receivable. In this regard, the Financial Accounting & Transactions Module H maintains state-of-the-art electronic and secured financial transactions which contemplates maintaining amounts paid, balances due, and contract amounts remaining.

This is accomplished starting with the originally approved estimate. This module then creates a purchase log that is constantly compared to the final vendor contractual commitments, general condition costs, general requirement costs, change directives, and other soft costs that may be presented by certain projects, and any factoring market conditions. This module controls and tracks payments from the owner, payments to vendors, inhouse costs, soft costs paid, etc. This module further enables Profit and Loss or P&L status of some or all parties involved if elected by the user.

BRIEF DESCRIPTIONS OF THE DRAWINGS

Other features and objectives of the present invention will become more evident from a consideration of the following brief descriptions of patent drawings.

DETAILED DESCRIPTION OF THE PREFERRED SYSTEM AND PLATFORM

As prefaced above, there is basically a twofold intent to the present invention. Firstly, the present invention provides a master operating or conversion system for allowing inter-module communication, orchestration, pricing, scheduling, contracting, procuring, delivering, constructing, tracking and management of an entire construction project build within a system of automation. Secondly, the master operating system comprises individual software-based and computer-implemented modules each of which are uniquely inventive unto themselves and are designed to cooperate with existing and developing technological advances in the field to constantly enhance the overall system otherwise denoted as the AUTOBUILD 2020 construction projection management system or platform as generally depicted and referenced at 500 in FIG. 10. As other developers in the field advance the technology, it is contemplated the present invention may embrace the advances in a cooperative manner that will operate to both enhance the AUTOBUILD 2020 system or platform 500, which may in turn further enhance those independent outside or peripheral technologies.

Following on the foregoing summaries of Modules B—H the following further specifies nodes associated with each Module as summarized hereinabove. In this regard, each node is denoted with a prefix letter that matches the Module to which the node is most closely associated. For example, the B5 Node is substantially the same as or embraced by the Design Input Conversion & Management Module B otherwise comparatively depicted in FIGS. 1 and 2. Module C basically comprises Nodes C6, C7, C8, C9, and C10; Module D basically comprises Nodes D20, D21, D22, D23, and D24; Module E basically comprises Nodes E40, E41, E42, E43, E44, and E45; Module F basically comprises Nodes F50, F51, and F52; Module G basically comprises Nodes G80, G81, G82, G83, G84, and G85; and Module H is substantially equivalent to Node H100, all of which are discussed in more detail by the following descriptions.

Figure 1:
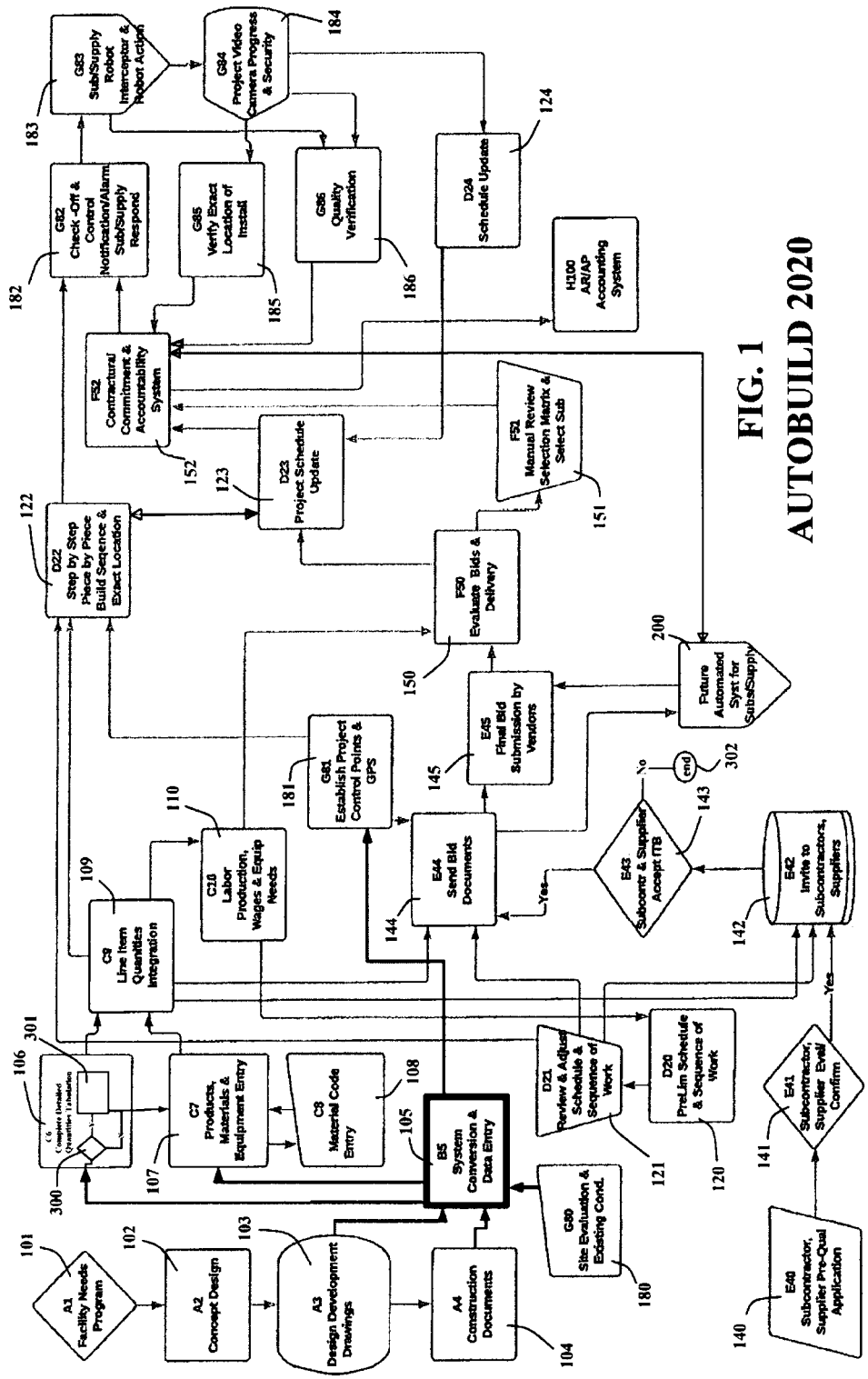
FIG. 1 is a first master flowchart diagram depicting directional flow, relationships, and interconnectivity of various systemic modules supportive of the AUTOBUILD 2020 system according to the present invention.
Figure 2:
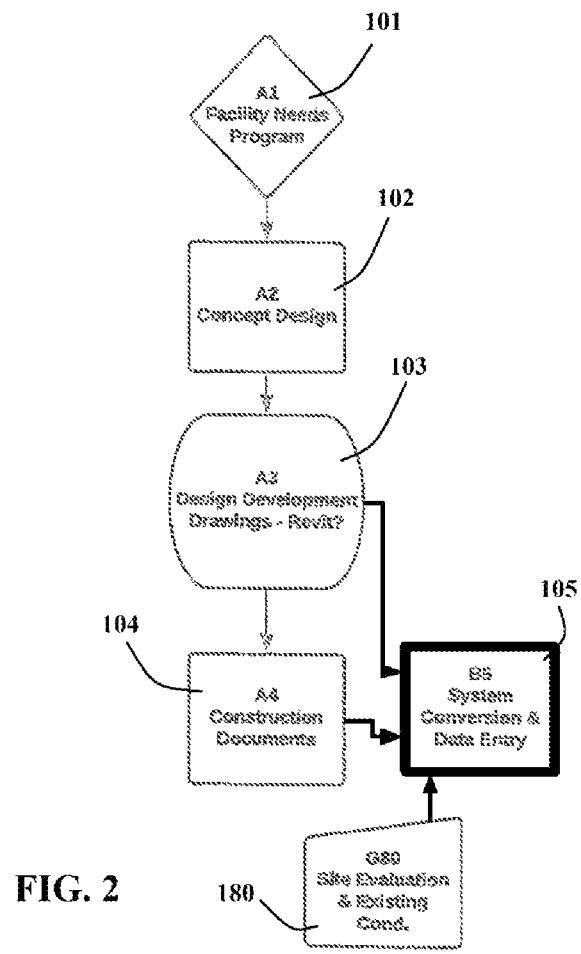
FIG. 2 is a flowchart diagram of a central first systemic Data Input Conversion & Management Module B with peripheral module components interconnected therewith for inputting data therein according to the present invention.
Figure 3:
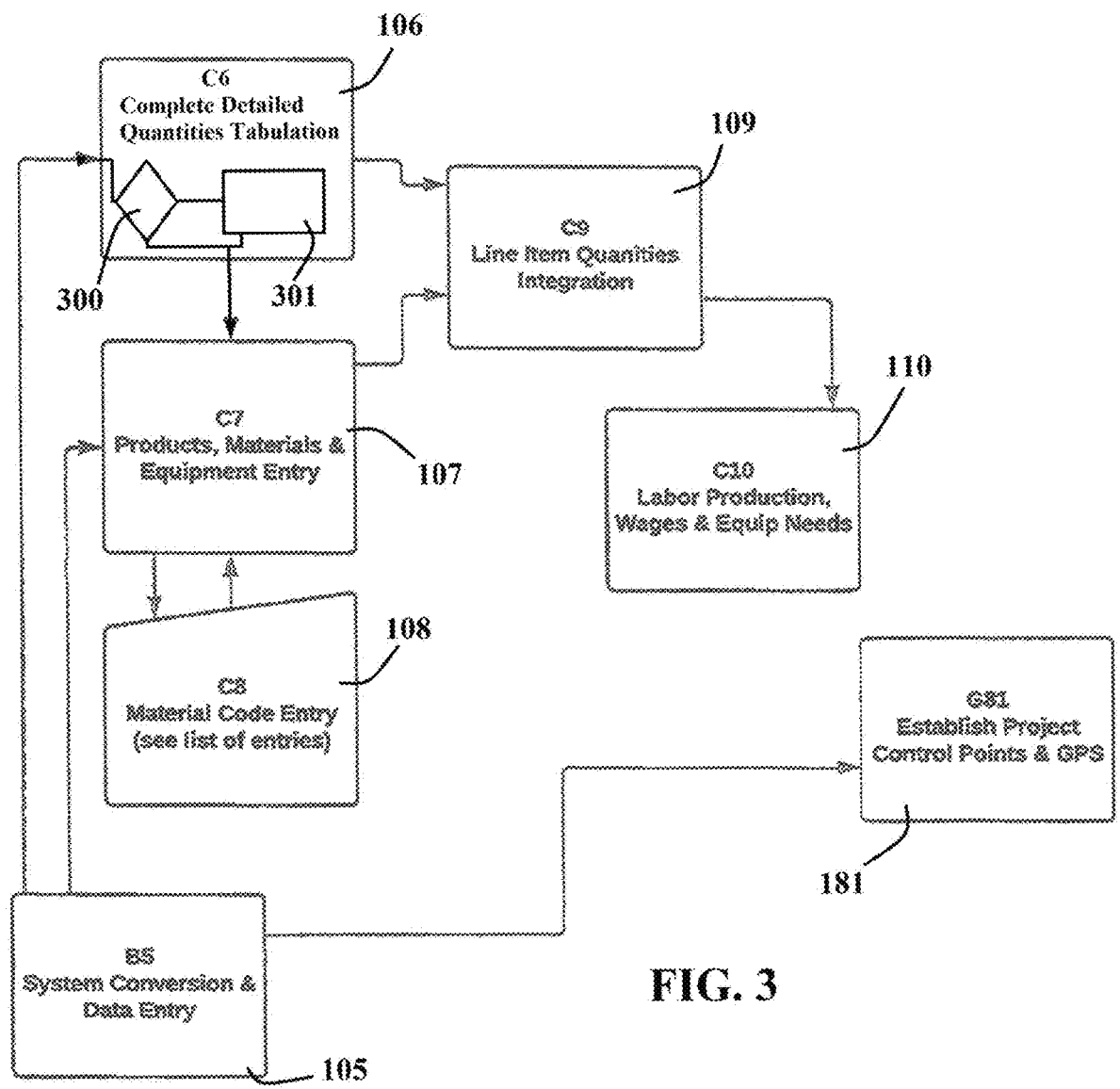
FIG. 3 is a flowchart diagram of a second systemic Project Data Survey, Code Match, & Organize Module C with peripheral module components interconnected therewith and depicting peripheral data flows according to the present invention.
Figure 4:
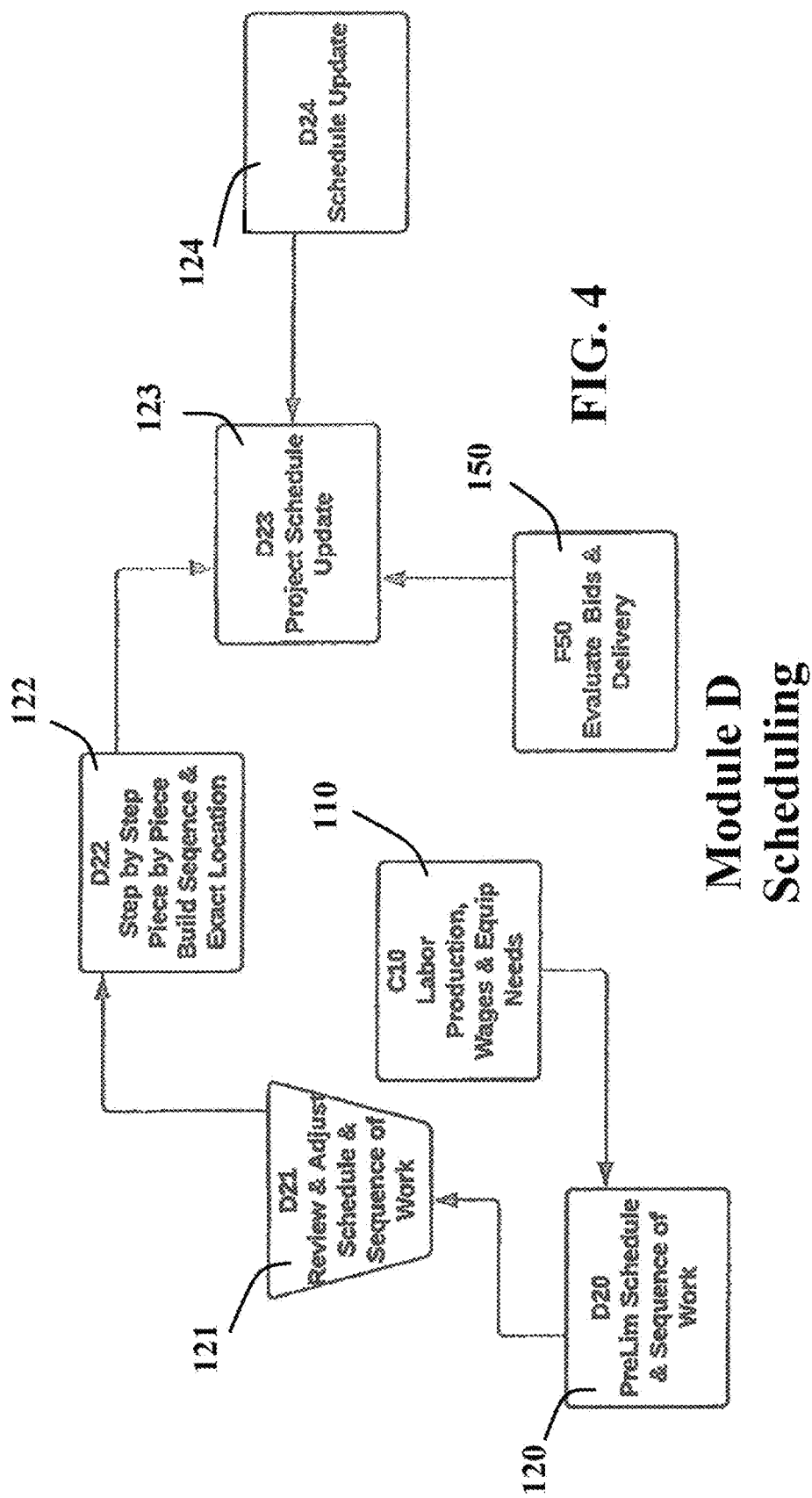
FIG. 4 is a flowchart diagram of a third systemic Scheduling Module with peripheral module components interconnected therewith and depicting peripheral data flows according to the present invention.
Figure 5:
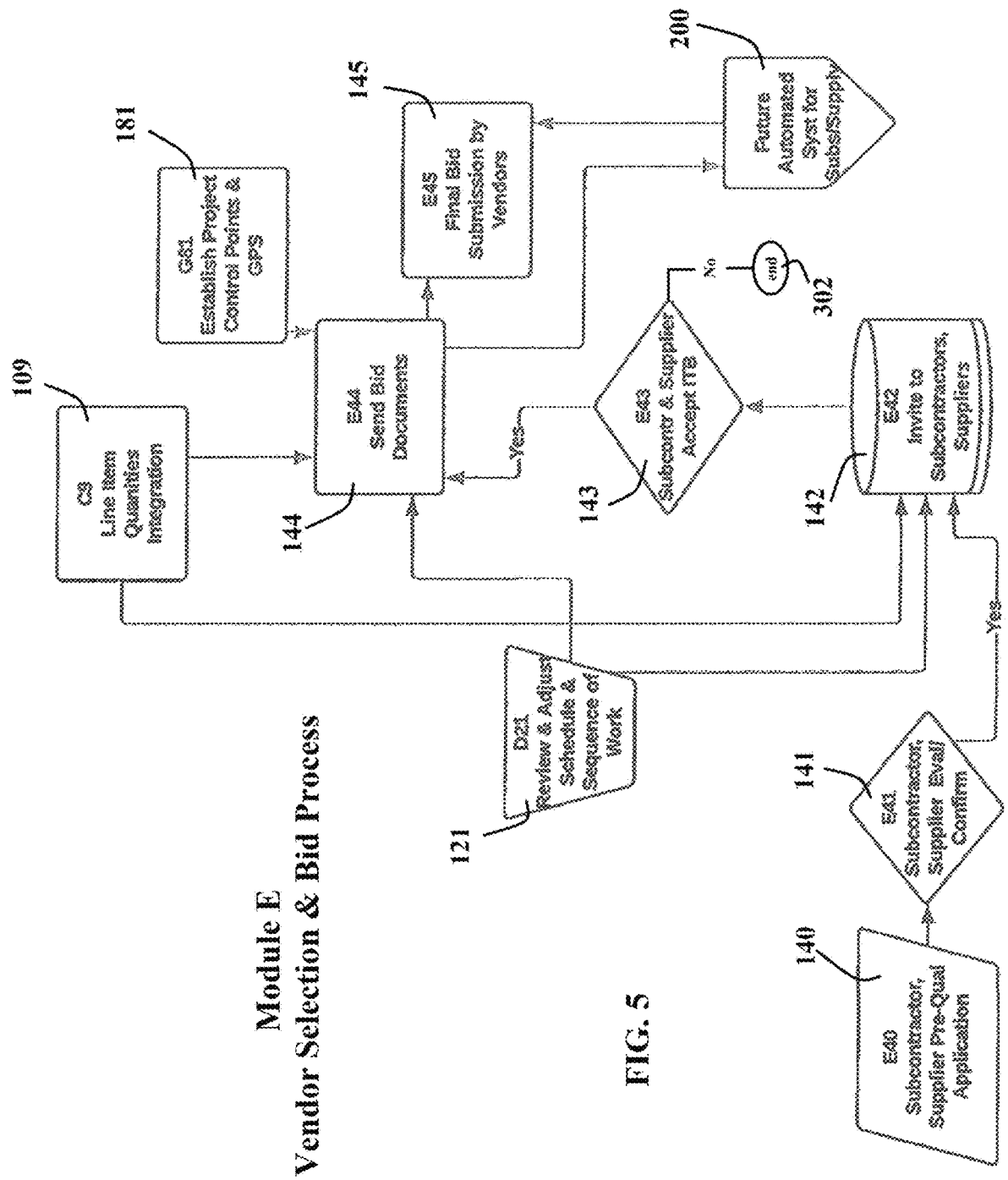
FIG. 5 is a flowchart diagram of a fourth Vendor Selection & Bid Process Module with peripheral module components interconnected therewith and depicting peripheral data flows according to the present invention.
Figure 6:
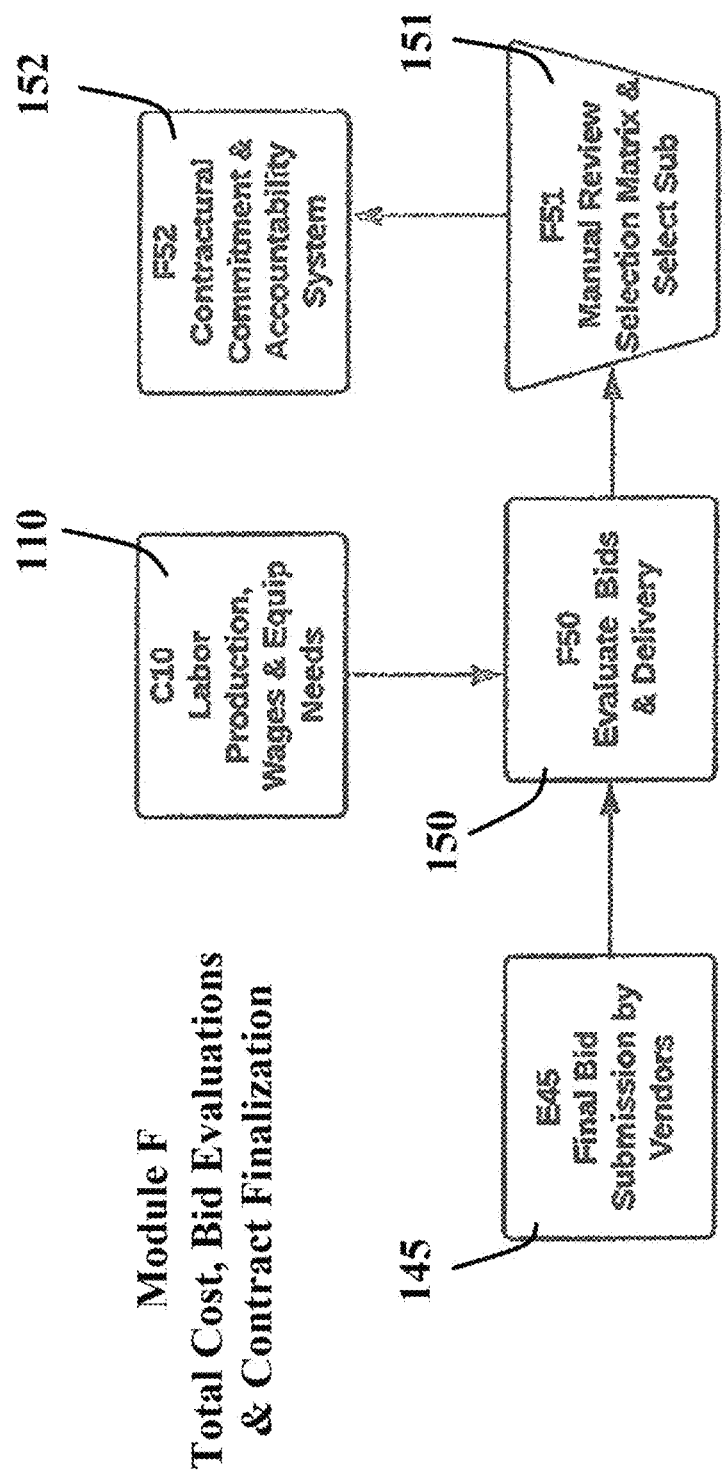
FIG. 6 is a flowchart diagram of a fifth systemic Total Cost, Bid Evaluations & Contract Finalization Module with peripheral module components interconnected therewith and depicting peripheral data flows according to the present invention.
Figure 7:
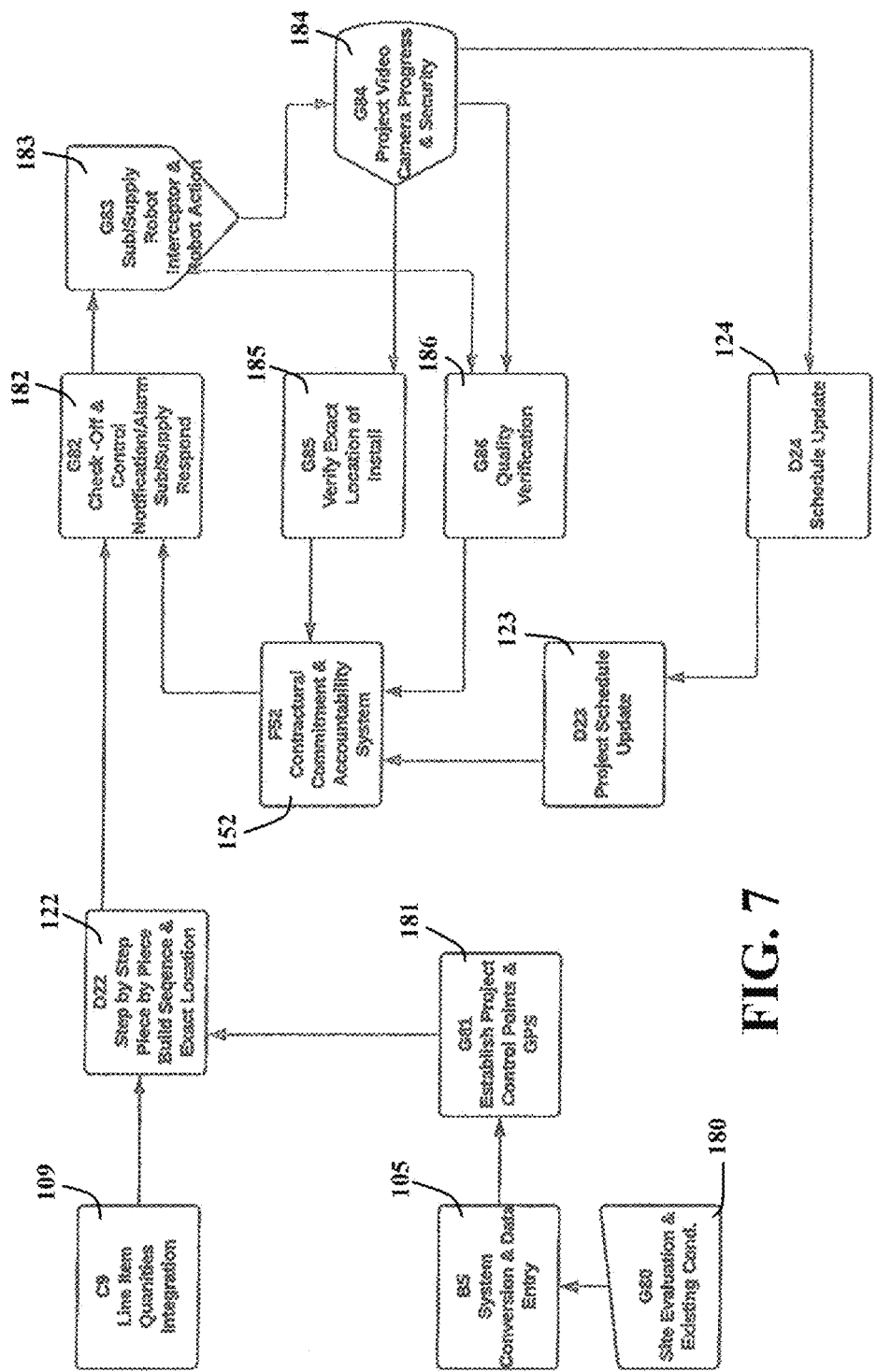
FIG. 7 is a flowchart diagram of a sixth systemic Project Assembly & Quality Verification Module with peripheral module components interconnected therewith and depicting peripheral data flows according to the present invention.
Figure 8:
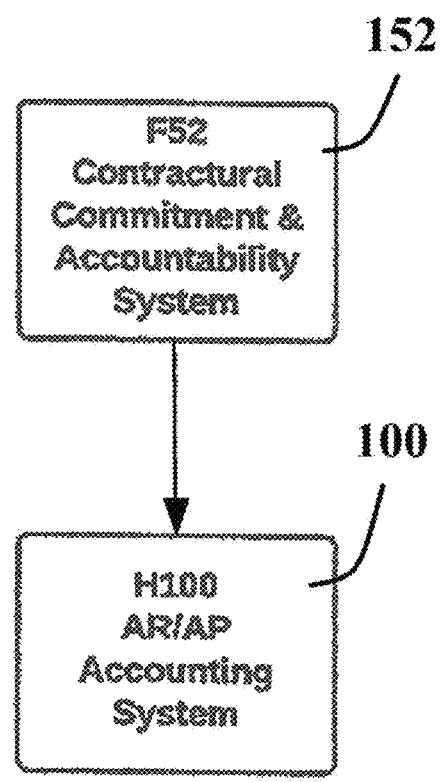
FIG. 8 is a flowchart diagram of a seventh systemic Financial Accounting & Transactions Module with a peripheral module component interconnected therewith and depicting peripheral data flow into the module according to the present invention.
Figure 9:
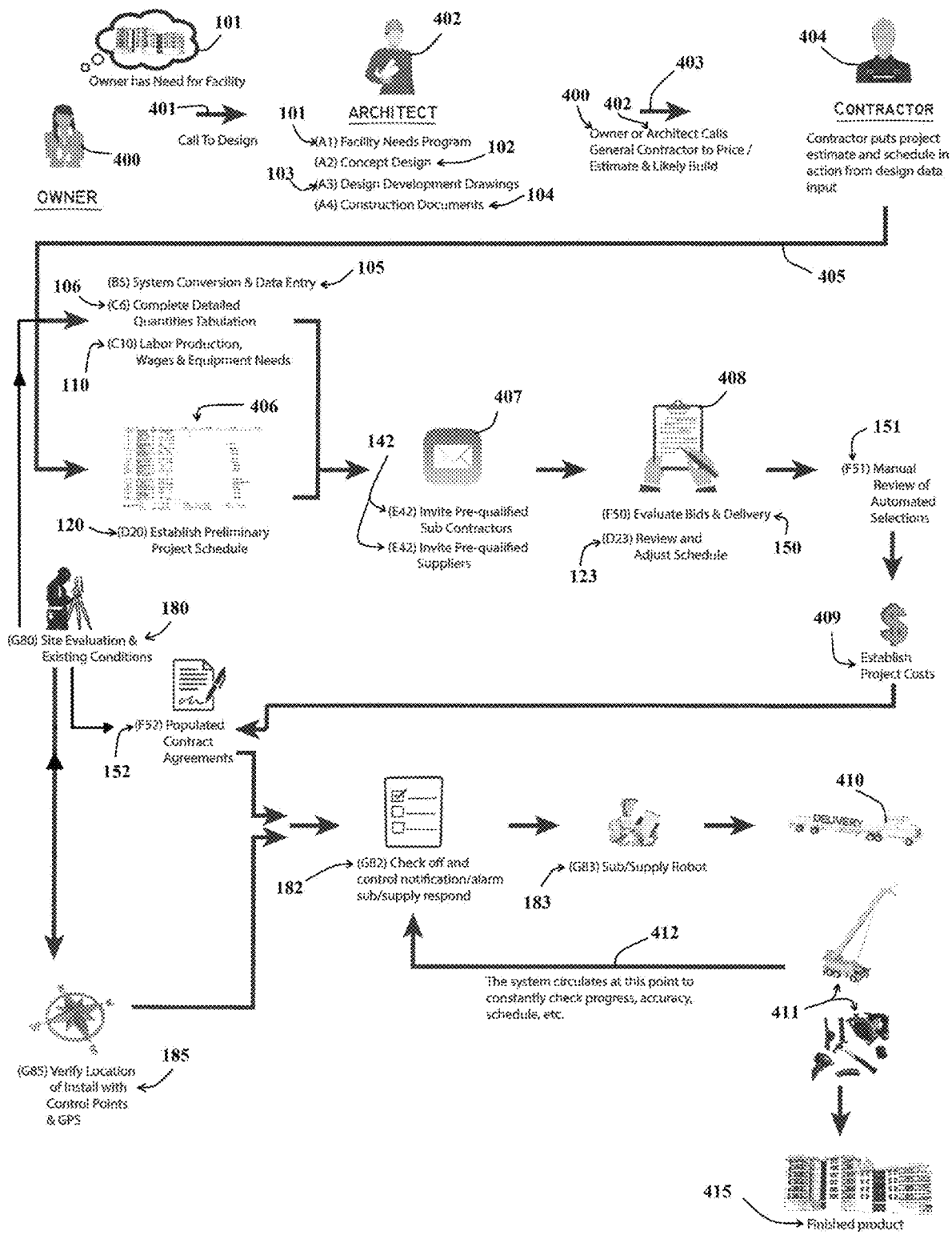
FIG. 9 is a second master flowchart diagram depicting directional flow, relationships, and interconnectivity of various key aspects of a generic construction project as supported by the systemic modules supportive of the AUTOBUILD 2020 system according to the present invention.

Comparatively referencing FIGS. 1, 2, and 9, for example, the reader will there consider the A1, A2, A3, and A4 Nodes as at 101, 102, 103, and 104, respectively. The following is a narrative of the function of the A1-A4 Nodes as referenced at 101, 102, 103, 104 upon which the AUTOBUILD 2020 system/platform 500 according to the present invention builds, and thus technically fall outside the scope of the present invention although it should be noted the present invention necessarily receives input from the A nodes so as to properly manage the remainder of the project.

The A1 Node referenced at 101 is a Facility Needs and Programming Node. This is the first stage of a project where an outside owner/customer as denoted at 400 in FIG. 9 decides it requires a facility or expansion and communicates as at 401 the requirement to an Architect or Engineer or A/E as at 402. The Architect or Engineer (A/E or Design) industry professional 402 creates a framework called Facility Needs and Programing as at 101. This framework sets the criteria with which to start designing the facility including such facility aspects as size, level of floors, functions, special equipment accommodation, special climate control, level of finishes, access needs, etc.

The A2 Node referenced at 102 is a Conceptual Design Node. This is a node state in which the A/E (Design) industry professional 402 completes an initial design of the facility for the owner/customer 400 to review. This node provides the first few steps the design professional 402 takes to make sure the design professional's 402 vision for the project is in agreement with the vision the owner/customer 400 has for the facility so as to avoid spending substantial amounts of time and cost developing a design that is otherwise developing in a disagreeable direction as dictated by the owner/customer 400.

The A3 Node referenced at 103 is a Design Development Drawings Node. This is a development phase in which the A/E (Design) industry professional 402 completes the design in further detail and begins providing specifications on form and function along with material support for the project. This is an intermediate step in which the design is considered approximately 70-80% complete. It sets a milestone for another review with the owner/customer 400 to confirm the design meets the needs of the owner/customer 400. This stage also allows contractors to start reviewing the facility and design to provide initial pricing for the owner/customer 400 to ensure the project is being designed within the allocated budget.

The A4 Node as referenced at 104 is a Construction Documents Node. This development phase or state occurs when the A/E (Design) industry professional 402 completes the design with final details or specifications. It includes the finer specifics of each element of the project, and specifies each material to be used to the specifics of color, manufacture, special requirements, etc. The AUTOBUILD 2020 system/platform 500 according to the present invention is designed to receive the Construction Documents and analyze the Construction Documents for errors or inconsistencies.

In other words, the data input is reviewed by the AUTOBUILD 2020 system/platform 500 for identifying specifics that have not been provided or designed and thus the A4 Node 104 can be optionally completed with the AUTOBUILD 2020 system/platform 500 according to the present invention. The reader will again note that Nodes 101-104 are not included in AUTOBUILD 2020 system/platform 500 according to the present invention, but are direct, critical inputs from the A/E industry in state-of-the-art formats currently available in the market.

Referencing FIG. 9, the reader will there consider that either the owner/customer 400 or A/E (Design) industry professional 402 then communicates as at 403 with a general contractor 404 to make enquiries regarding pricing/estimates based on the project documents developed to date.

The general contractor 404 directs as at 405 the project estimate and schedule into the flow as developed from design data input as received from the A/E (Design) industry professional 402. In this regard, the reader will further consider certain key or primary Nodes B5, C6, C10, and D20 as generally referenced in FIG. 9 and discussed in more detail below.

Referencing Node B5 at 105 in FIGS. 1 and 2 as highlighted in boldface lining, the reader will there consider a System Conversion and Data Entry Node substantially equivalent to the Design Input Conversion & Management Module B prefaced above. This is the entry point or component of the system that receives the design development drawings as provided by Node 103 and the construction documents as provided by Node 104. In other words, the B5 Node or Module 105 operates as a portal for receiving electronic design information from the general contractor 404 or A/E (Design) industry professional 402. The B5 Node or Module 105 receives and converts the electronic design information and design intent into an information file to be used to communicate to the rest of the AUTOBUILD 2020 system/platform 500 to carry out the entire completion of the project and as such is central to the practice of the present invention.

For example, Node or Module B5 as at 105 may preferably operate to receive an AUTODESK® Revit or AutoCAD design file as provided by Autodesk, Inc., a Delaware Corporation with business address of 111 McInnis Parkway, San Rafael, Calif., 94903. The AUTOBUILD 2020 system/platform 500 accordingly receives data via Node B5 or Design Input Conversion & Management Module B as at 105, and converts the data provided by the incoming design file, which converted data is recognized by the master operating system/platform 500 to carry out all the tasks needed to complete the pricing and construction of the project.

The reader will further note that Node 105 further operates to receive data input from a Site Evaluation and Existing Conditions Node as at 180 in up-flow communication with the B5 Node or Design Input Conversion & Management Module B as at 105. The data provided by this entry point G80 Node 180 derives from existing knowledge, data and documents depicting the current site conditions along with GPS and camera monitoring systems to evaluate site conditions needed to be considered for the construction of the project.

The G80 Node 180 assists in providing data concerning all types of site conditions such as existing structures on the site, existing utilities, topographic elevations of the site, water flow and sheeting across the site, locations of existing curbs, paving, and other traffic rights-of-way, etc. The G80 Node as at 180 is utilized in the planning of the project, determination of scope, and coordinating project site logistics. This G80 Node 180 is linked to the G81 Node as at 181 via the Design Input Conversion & Management Module B or B5 Node as at 105 for supporting development of all the project control points.

Node C6 or 106 is a Detailed Quantities Tabulation Node in unidirectional downflow communication with the B5 Node as at 105. The Detailed Quantities Tabulation Node 106 operates to identify and quantify each specific material piece or required for the project in detail from large equipment and structural components such as excavation cut and fills, steel members, electrical conduits, and masonry flashings to smaller items such as fasteners (e.g. screws and nails) and adhesives. If an element or piece appears to be missing (as at "element missing" query box 300) from the design specifications to complete the project, an RFI alert is communicated in a Request for Information document or RFI format as at RFI Alert box 301 before the entire process can be calculated and completed. The Detailed Quantities Tabulation Node 106 ensures that every piece of material required for the project has a quantity.

Node C7 as at 107 is a Materials, & Equipment (Product) Designations Node in unidirectional downflow communication with the B5 Node 105. The Materials, & Equipment (Product) Designations Node 107 ensures that every material element and piece of equipment is properly identified as to exactly what it is as required in the development of the specifications describing all products required for the project. When the system identifies an element that is required, but not yet specified, the system will prompt the user with a notice that a product has not been specified. Node 107 may optionally suggest a preferred product or material element.

Node C8 as at 108 is a Product Code Entry & Database Node in bidirectional communication with Materials, & Equipment (Product) Designations Node 107. The Product Code Entry & Database Node 108 is the port of entry for selecting and specifying each material and piece of equipment (Product). The Product Code Entry & Database Node 108 builds a database of all materials and pieces of equipment that are utilized in the industry for building facilities.

Product Code Entry & Database Node 108 is preferably designed to provide a selection process that can either be manually updated or automatically updated as necessary for matching and entering all products required for the project. The material code entry listing data may preferably include, but not be limited to (1) Building Product and Construction Material Division Number(s) data; (2) Type(s) of Material data; (3) Long Lead Item(s) data; (4) Weather Sensitivity data; (5) Required Predecessor data; (6) Special Requirements data; (7) Weight data; (8) Size (data); (9) Color data; and (10) Quantity data (if known).

Node C9 as at 109 is a Line-Item Quantity Integration Node in unidirectional downflow communication with both the Materials, & (Product) Designations Node 107 and the Product Code Entry & Database Node 108. The Line-Item Quantity Integration Node 109 creates the first stage of the cost estimate summary by combining and tabulating data as received from Nodes 107 and 108. The Line-Item Quantity Integration Node 109 organizes all products needed for the project with the required quantity in a spreadsheet-like format and further communicates the organized information clearly so that associated costs can be solicited. Node 109 communicates with the Subcontractor and Supplier Invite Node D22 as at 122 (i.e. an Invitation to Prequalified Subcontractors & Suppliers Node 122) for identifying piece-by-piece building requirements and tapping into a resource database as built into Subcontractor and Supplier Invite Node 122.

Node C10 as at 110 is a Labor Production, Wages, and Temporary Materials & Equipment Node is in unidirectional downflow communication with the Line-Item Quantity Integration Node 109. The Labor Production, Wages, and Temporary Materials & Equipment Node 110 identifies all items in Node 109 that require labor, permanent & temporary materials & equipment to assemble parts of the project. Node 110 thus receives the product line item and quantity from Node 109 and calculates the standard production that will be required to put the product in place.

The C10 or 110 Node also considers the level of difficulty or ease with which the proposed production could be carried out and make final adjustments to that production. This node understands the wage rates in which the project is located and utilizes those wage rates in calculating the total labor cost for that line item. In this regard, it is contemplated that manual labor is becoming increasingly replaced by automated means. Accordingly, construction projects are becoming increasingly automated. The AUTOBUILD 2020 system/platform 500 according to the present invention is designed to embrace these automated assembly methods by way of Node C10 as at 110.

In other words, the C10 Node as at 110 is designed to constantly evolve as automation of labor enters the industry. Notably, many aspects of a build project require not only manual labor, but also permanent/temporary materials and equipment to support the labor/assembly function. Examples of temporary equipment may include machinery used for demolition and excavation; formwork for pouring concrete; shoring and/or scaffolding material; equipment utilized for earth retention or access to higher portions of a facility; temporary enclosures which are utilized for traffic control or maintaining heated environments within colder working conditions, etc. The temporary materials and equipment are very much associated with the labor requirements of the project and not as clear-cut as a direct, permanent line item. These temporary materials and equipment are thus identified and costed by way of Node C10 as at 110.

Node C10 as at 110 is further utilized to create an initial cost estimate of assembly labor for the project and is utilized as a resource and comparison to the subcontractor market that shall be bidding and providing firm contractual cost commitments to the project. Information from Node C10 is also utilized to compute the basic project schedule function of the Preliminary Schedule & Sequence of Work Node D20 as referenced at 120 in downflow communication with Node C10 or 110. Node C10 as at 110 is further utilized to confirm and evaluate the total cost bid evaluation function of the Evaluate Bids and Delivery Node F50 as referenced at 150 in downflow communication with Node C10.

The D20 Node referenced at 120 is a Preliminary Schedule & Sequence of Work Node. The D20 Node as at 120 comprises standard assembly intelligence built into its system and evaluates the contract documents; line items products and quantities as at generic spreadsheet 406; generates labor productions; and produces a preliminary project schedule based on this information. The D20 Node further considers site logistics, level of difficulty of project, effects of weather from the region, etc.

The schedule produced is easily legible and understood by a construction professional with ordinary level of skill or construction assembly knowledge. The D20 Node 120 is available to vendors to review and comment on its accuracy which will alert the AUTOBUILD 2020 system/platform operator to evaluate in Node D21, which Node D21 is a Manual Review and Adjustment of Schedule and Sequence Node as referenced at 121 in downflow communication with Node D20.

The Manual Review and Adjustment of Schedule and Sequence Node D21 referenced at 121 converts the product/data generated by Node D20 into a format that can be manually reviewed and adjusted by a human operator pre-authorized to make such modifications. This node will also utilize input received from the vendors bidding the project to properly sequence and schedule durations.

Node D22 is a Step-by-Step Assembly Sequence and Three-Dimensional Location Settings Node referenced at 122. The D22 Node 122 is preferably bifurcated and may be considered a first of the central nodes or brains of the AUTOBUILD 2020 system/platform 500. The D22 Node 122 establishes a three-dimensional or 3D control system within which the project is to be built and confirms that the elements of the facility are in the exact spatial location as required.

As the D22 Node 122 manages and oversees the placement of each element within the 3D environment, it is also communicating with the scheduling portions of the system, such as the D23 Node referenced at 123 in bi-directional communication with Node D22 to confirm elements are being installed in proper sequential order as required. The D22 Node as at 122 further operates in conjunction with Node G82 in downflow communication therewith to maintain constant updates as to what the actual conditions are on the project site. If some aspect of the project is amiss, the G82 Node as at 182 sends out alerts that corrections are required.

The D23 and D24 Nodes as referenced at 123 and 124 respectively, are essentially Project Schedule Update or Review and Adjust Schedule Nodes, both of which are in downflow communication with the D22 Node as at 122. While the D23 Project Schedule Update Node 123 is in direct downflow communication with the D22 Node, the D24 Schedule Update Node flows from an onsite surveillance node denoted by the G84 Node otherwise denoted as a Project Video Camera Progress and Security Node and referenced at 184. The D23 and D24 Nodes work in a very similar manner by constantly measuring actual build progress and comparing the actual build progress to the planned project schedule.

The reader will note, however, that the D23 Node as at 123 primarily functions as a preliminary update node or module upstream or in up-flow communication with the F52 Node described as a Contractual Commitment and Accountability System Node as referenced at 152. The Contractual Commitments and Accountability System Node 152 ensures the correct updated schedule information (best at the time) is implemented in the contracts with the vendors. The D24 Node as at 124 is placed within the revolving circle of actual on-site progress as updated by the G84 Node as at 184, and transmits scheduling information to the system governance nodules or brains that are constantly managing the sequence and accuracy of the work as exemplified by the B5, C10, D23, E41, F50, and G82 nodes. The AUTOBUILD 2020 system/platform 500 is complex and while each Module and Node plays a key role, each Module is believed to have a key operating/governing node exemplified by the B5, C10, D23, E41, F50, and G82 nodes.

The E40 Node as referenced at 140 is a Vendor (Subcontractor and Supplier) Prequalification Application Node. The E40 Node as at 140 is the portal for all Vendors (Subcontractors & Suppliers) wishing to be part of and utilized within the AUTOBUILD 2020 system/platform 500. Vendors are required by the AUTOBUILD 2020 system/platform 500 to provide a substantial amount of information in order to be prequalified and considered a resource to the AUTOBUILD 2020 system/platform 500. The types of information required of Vendors will include, but not necessarily be limited to information pertaining to the products they provide/manufacture; the number of employees, financial strength, financial statements, production capability, raw material access, delivery capability, past performance, etc.

The E41 Node referenced at 141 is a Subcontractor, Supplier Evaluation-Confirmation-Approval Node in downflow communication with the E40 Node. The E41 Node as at 141 evaluates information received from the E40 Node as at 140 and rates each vendor based on the information provided such as products provided, number of employees, financial strength, financial statements, production capability, raw material access, delivery capability, and past performance as prefaced above. After a thorough investigation and evaluation, a comprehensive rating is sent to the E42 Node as referenced at 142 in downflow communication with the E41 Node to be stored in a database made part of the E42 Node and utilized as a resource for the AUTOBUILD 2020 system/platform 500 according to the present invention.

The E42 Node as referenced at 142 is an Invitation to Prequalified Subcontractors & Suppliers Node in downflow communication with the E41 Node as well as the C9 and D21 Nodes. The E42 Node interprets information sent to it from the C9 Node as at 109 concerning products and quantities needed for the project along with schedule and sequence information provided by the D21 Node as at 121. The information received is compared against the information stored in the database for subcontractors and suppliers to utilize and to whom bid solicitations may then be sent as at envelope symbol 407 as depicted by the E43 Node referenced at 143 and described as a Vendor Invitation to Bid Acceptance Node in downflow communication with the E42 Node.

The bid invite/solicitations sent out by the E42 Node as at 142 contain initial information concerning product specifications along with associated quantities needed for the project and further sets forth preferred/required dates for product delivery and/or installation scheduling as governed by the D23 Node. This process allows the vendor to decide on whether to respond to the invitation to bid. The information format sent by the E42 Node as at 142 allows vendors to interpret and assess either manually by a human operator or by way of an automated system (e.g. the AUTOBUILD 2020 operating system/platform 500) with a subsequent response or answer to the invitation communicated back into the automated language of the AUTOBUILD 2020 operating system/platform 500.

As prefaced above, the E43 Node as at 143 is a Vendor Invitation to Bid Acceptance query type Node in downflow communication with the E42 Node. The E43 Node as at 143 is simplistic in design and manages those vendors indicating an interest in the project and indicating a commitment to respond to the invitation to bid. Once a vendor accepts the Invitation to Bid or ITB, the E43 Nodes 143 initiates a further transmission of the balance of detailed bid document information to responding vendor. Non-accepting vendors are eliminated from the system as at end/terminate element 302.

The E44 Node referenced at 144 is a Send Final and Complete Bid Documents Node. The E44 Node is a secondary brain according the present invention that assembles or compiles all final information concerning details of scope of work and required performance time and transmits this compiled information to all vendors that have accepted the bid invitation. The bid documents sent out by the E44 Node as at 144 comprise final detailed information concerning product specifications along with their associated quantities needed for the project and sets forth required dates for delivery and installation scheduling governed by the D23 Node as the system/platform 500 moves the project forward toward a finished product as 415.

The information formatting sent by the E44 Node allows vendors to interpret and assess either manually by way of a human operator or by way of an automated system (e.g. the AUTOBUILD 2020 operating system/platform 500) and responded to by the automated language of the AUTOBUILD 2020 operating system/platform 500. The vendors are provided with AUTOBUILD 2020 system formats that the vendors can input in their own respective customized response data centers with parameters in order to automate vendor pricing for the line items in bidding and for confirmations that the individual vendors can meet the required completion time on the project. If elected by the individual or select vendors, the E44 Node operates similarly as compared to the C10 Node within the AUTOBUILD 2020 system/platform 500. In this regard, it will be recalled the C10 Node can be easily utilized within the F50 Node to evaluate the vendor bids being received.

The E45 Node is a Final Bid Submission by Vendors Node and is referenced at 145. The E45 Node allows a vendor to transmit its bid response which can be done manually if it conforms to the AUTOBUILD 2020 input system or in an automated manner that is communicated through the format provided by the AUTOBUILD 2020 system/platform 500. A final bid submission will be required by the vendor(s) and managed by this node to confirm the vendor commitment(s) to meet the delivery date for its portion of the project.

The reader will note that the E45 Node as at 145, to some extent, lies outside of the central AUTOBUILD 2020 system/platform 500 as it is controlled by the vendor with its own response data and parameters. This node information can then be used in the F50 Node as at 150 in downflow communication with the E45 Node to be evaluated. When approved the vendor will be notified by the F52 Node as at 152 and contracted to begin to manufacture, deliver, and or build its line item of the project by sending it to the AUTOBUILD for Vendors System Node 200 in bi-directional communication with the F52 Node at 152. The AUTOBUILD for Vendors System Node 200 provides additional software-based functionality that can be utilized and customized to automate the vendor's production of its work as discussed in more detail later below.

The F50 Node is an Evaluation of Bids and Project Delivery Time Node referenced at 150 as depicted, in part, by a generic clipboard symbol 408 operating to also denote or depict the Review and Adjust Schedule Node D23 or node 123 since scheduling depends on delivery evaluation(s). The F50 Node gathers all information, contract requirements, and bids received, and evaluates, in a chronological order, the lowest responsible bidder that can also meet the scheduled time of completion for its line item. For each line item, this node ranks in order of the best bid received and provides a listing of criteria with exemplary indicators (e.g. plusses and minuses) for each bidder in a sequential manner as it goes down the listing of criteria.

The F50 Node as at 150 further functions to consider and compare the information provided by the C10 Labor, Production, Wages & Equipment Needs Node as at 110 to help assess whether the bids provided are within certain parameters or are close to anticipated bid expectations. Should the total cost exceed owner/customer expectations and budget, the F50 Node as at 150 allows for adjustment and value engineering input to be implemented for selected line items to be then rebid developing a new adjusted total cost for the project.

The F51 Node is a Manual Review and Matrix of Vendor Selection Node referenced at 151 in downflow communication with the F50 Node. The F51 Node as at 151 allows the collaboration and independent review of a human operator to confirm which bid the owner/customer 400 wishes to utilize as the lowest responsible bidder from the vendor selection otherwise provided by the AUTOBUILD 2020 system/platform 500 according to the present invention. The F51 Node thereby provides an important check and balance for the AUTOBUILD 2020 system/platform 500. The F51

Node is the last modular step before entering into contractual commitments with the vendor(s) and establishing project costs as at 409.

As prefaced above, the F52 Node is a Contractual Commitment and Accountability System Node at which node contract agreements are populated as referenced at 152 in downflow communication with the F51 Node as at 151 and the D23 Node as at 123 as well as a Verify Exact Location of Install Node G85 as at 185 and a Quality Verification Nod G86 as at 186 as respectively discussed in more detail below. The F52 Node as at 152 essentially confirms in written detail the scope of work to be provided along with performance criteria including schedule requirements and drafts/provides a legal contract document to be approved and executed by the vendors.

As previously referenced, the Site Evaluation & Existing Conditions G80 Node is referenced at 180 in up-flow communication with the B5 Node as an entry point for inputting existing knowledge, data and documents depicting current site conditions along with GPS and camera monitoring systems to evaluate site conditions needed to be considered for the construction of the project. In this regard, the G80 Node as at 180 is a hybrid type of node and has A Module or A Node characteristics at least insofar as it provides site assessment functionality for setting up the AUTOBUILD system/platform 500 to operate smoothly as it feeds the B5 Node with site information.

The G80 Node as at 180 is also in up-flow communication with the G85 Node as at 185 and assists in monitoring all types of site conditions such as existing structures on the site, existing utilities, topographic elevations of the site, water flow and sheeting across the site, locations of existing curbs, paving, and other traffic rights-of-way, etc. The G80 Node is utilized in the planning of the project, determination of scope, and coordinating project site logistics.

The G80 Node is also in indirect communication with an Establishment of Project Control Points & GPS Node as at G81 or 181 for more properly developing all project control points, and is basically a utility in establishing and setting all control points and GPS locations for the project. The G81 Node also inputs into node D22 (Step-by-Step Assembly Sequence and Three-Dimensional Location Settings) which is a first brain node according to the present invention that requires this information to accurately place and coordinate all elements of the project.

Node G82 as referenced at 182 is a Work in Place Check Off System-Control, Confirmation, Notification, Alarm, and Vendor Response Node. The G82 Node is another important element that works closely in conjunction with the first brain D22 Node and the circular system of monitoring the actual work progress on site as at arrow 412. The G82 Node comprises all the required information and data for precisely coordinating and managing all building elements as they are assembled from the standpoint of verifying the products are (a) per specification, (b) positioned in the correct location(s), (c) assembled in the correct sequence, (d) connecting two adjacent products correctly, (e) meeting the project schedule, etc.

When the G82 Node detects a product problem (i.e. when something is amiss or not meeting the contractual requirements) notification(s) and/or alert(s) are sent out to the appropriate parties to make adjustments and corrections. For serious and urgent issues that have a major impact on the project or safety to people and the environment, a more robust alarm will be triggered to better communicate a sense of urgency. The G82 Node as at 182 utilizes, communicates, and coordinates with other nodes that form the physical monitoring and tracking system of the actual project status or current work flow.

The G83 Node is a Vendor Robot Interceptor & Robot Action Node as referenced at 183. The G83 Node operates from both within the software-based components of the AUTOBUILD 2020 system/platform 500 and also within software that may already be carried or implemented by vendors involved with the project. The G83 Node is basically the communication system that informs and directs human laborers, mechanical equipment, and robots to carry out the work required in the appropriate sequence, in the correct location, and at the correct time. The G83 Node further has the capability to communicate back to appropriate nodal functions that are needed for collaboration of physical actions so that on-site work advances properly.

The G84 Node is a Live Video Progress and Security surveillance Node as referenced at 184. The G84 Node coordinates live video through fixed cameras and drones and other sensors that are tied into GPS systems to track progress visually and materially in real-time at the project site. The G84 Nodes provides the eyes, ears, and fingers of the AUTOBUILD 2020 system/platform 500 that functions similarly to a human operator or superintendent in visualizing, inspecting, confirming, even touching and feeling elements of the project to ensure timely compliance with an ability to communication directly or indirectly with other support nodes to keep the circular system flowing toward progress. The G84 Node is preferably further equipped with sensors to detect temperature, moisture, density, etc. so as to help monitor, confirm, and communicate necessary information and data to appropriate peripheral support nodes within the AUTOBUILD 2020 system/platform 500.

The G85 Node is a Verification of Install Location Node and is referenced at 185. The G85 Node is preferably in indirect downflow communication with the G80 Node and G84 Node and in up-flow communication with the F52 Node. The G85 Node thus interacts with the G82, G84 and F52 Nodes to confirm and coordinate all elements of the project as they are being installed in the exact location required utilizing GPS systems along with the data giving direction for the correct installation.

The G86 Node is a Quality Verification Node referenced at 186. The G86 Node is basically an extension of the G84 Node as at 184 in downflow communication therewith and further interacts with the G83, G84, and F52 Nodes to confirm all products being installed precisely meet the project specifications. The G86 Nodes utilizes equipment that monitors assembly aspects such as temperature, moisture, density, connections, adhesives, GPS locations, etc. and compares this information with project requirements that have been designed and specified in the contract documents.

The H100 Node is an Accounts Receivable (AR) and Accounts Payable (AP) Accounting Systems Node as referenced at 100 and is substantially equivalent to the Financial Accounting & Transactions Module H as summarized above. The H100 Node is in downflow communication with the F52 Node and receives information from the D24, G82, G85, and G86 Nodes, which information will then be compared to the contractual commitments and financial arrangements set out in the F52 Node as at 152.

After verifying progress in terms of meeting schedule requirements, quality requirements, and percentage of completion, a payment voucher is generated to be approved by a check and balance system. This check and balance system is preferably collaborated and adjusted by a human operator approved to enter, review, and make corrections.

After final approvals have been agreed to by the vendor, contractor, and owner/customer, a payment will be made in a multitude of optional vehicles such as wire transfers, electronic checks, physical checks, etc. The H100 Node as at 100 operates and functions in the same manner as a traditional company's financial department and thus maintains all records in order as required to receive and make payments, track individual and overall percent completes, P&L projections, tax accounting, etc.

Node 200 is an AUTOBUILD for Vendors System as prefaced above. The AUTOBUILD for Vendors System Node 200 is an additional software-based system that operates similarly as compared to the AUTOBUILD 2020 system/platform 500, but is customized and adjusted to operate for the benefit of all vendors working in their unique way to conform for bringing products and services into the AUTOBUILD 2020 system/platform 500. The construction project management system according to the present invention thus contemplates a vendor system as at Node 200, substantially similar to the AUTOBUILD 2020 system/platform 500 and is thus built upon non-transitory, computer-implementable modules for enhancing vendor contributions thereto.

Although the AUTOBUILD for Vendors System Node 200 is not essential to the practice of the present invention, if included the Node 200 may well assist in vendor operation and facilities to bid, communicate, procure, fabricate, and deliver products to the jobsite in an automated manner otherwise being uniformly orchestrated within the AUTOBUILD 2020 system/platform 500. The AUTOBUILD for Vendors System Node 200 is thus a slightly modified version of the AUTOBUILD 2020 operating system/platform 500 according to the present invention.

Figure 10:
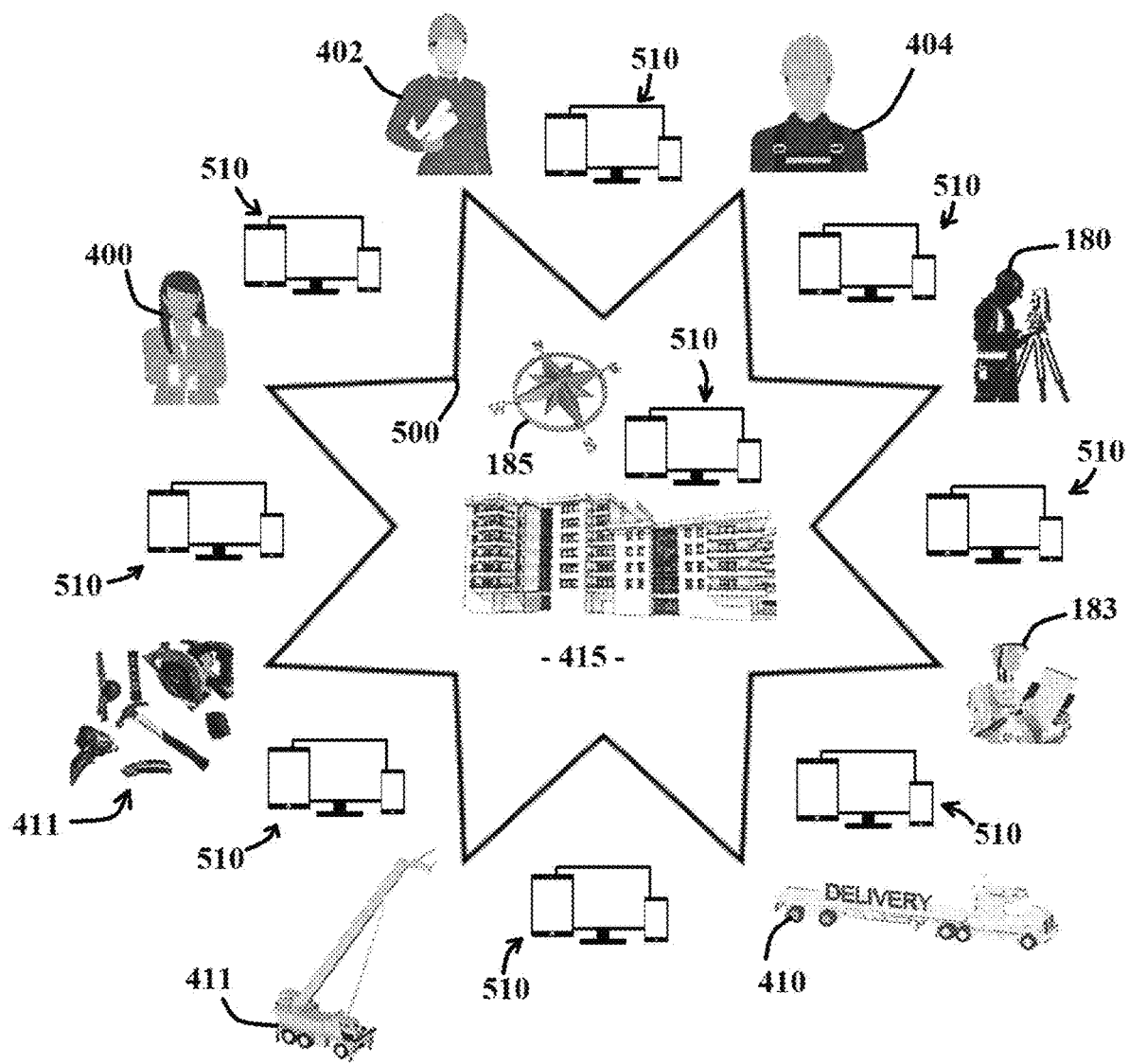
FIG. 10 is a diagrammatic depiction of the AUTOBUILD 2020 operating system according to the present invention as positioned within a computer-populated environment for enabling computer-implemented communications among the primary components and participants using the system.

In the preferred systemic embodiment according to the present specifications, it is contemplated the present invention is built to operate in a computer-populated environment as generally depicted in FIG. 10. Referencing FIG. 10, it will there be seen that each of the primary components/participants are in communication with one another by way of the AUTOBUILD 2020 operating system/platform 500. Each primary component interacts with the AUTOBUILD 2020 operating system/platform 500 by way of one or more computing devices/clients as at 510. The AUTOBUILD 2020 operating system/platform 500 according to the present invention basically provides a computer-implemented, multi-modular, software-based construction project management system/platform for facilitating comprehensive construction project management from design to build completion stages.

The construction project management system may be said to essentially provide or comprise (a) a platform to network a series of computers as at 510, which series of computers 510 are in networked communication with one another for implementing a series of non-transitory, software-based, platform-supportive modules as at Modules B-H; and (b) the series of non-transitory, software-based, platform-supportive modules as at Modules B-H as described hereinabove. More particularly, the series of non-transitory, software-based, platform-supportive modules may be said to essentially comprise a first Design Input Conversion & Management module; a second Project Survey, Code Match & Organize module; a third Scheduling module; a fourth Vendor Selection & Bid Process module; a fifth Total Cost, Bid Evaluations & Contract Finalization module; and a sixth Project Assembly & Quality Verification module.

The first Design Input Conversion & Management module (i.e. Module B as at 105) basically operates to convert design data for a project design received from a design provider into a revised format for enabling peripheral modules in communication with the first Design Input Conversion & Management module to successfully carry out peripheral module functionality. Peripheral module functionality is believed to embrace all successive functionality provided by the second through sixth modules and that of any optional successive modules as for example, a seventh Financial Accounting & Transactions module or Module H or H100 Node.

The second Project Survey, Code Match & Organize module as at Module C preferably comprises Nodes C6, C7, C8, C9, and C10, which nodes operate to code and quantify every element to complete the design project. The second Project Survey, Code Match & Organize module may further operate to summarize material and equipment requirements into a cost estimate summary. The third Scheduling module as at Module D preferably comprises Nodes D20, D21, D22, D23, and D24 and basically operates to provide a preliminary schedule for the design project and means for updating the preliminary schedule as update data is received by the third Scheduling module by way of peripheral modules in communication therewith for providing a final schedule.

The third Scheduling module as at Module D, preferably comprising Nodes D20, D21, D22, D23, and D24, may further operate to track project status of the design project in real time for providing current status of the design project in comparison to the final schedule. The third Scheduling module may further operate to manage procurement processes of the previously designed project, and track quantities and types of support elements being provided by each subcontractor and/or supplier so as to support progress of the project managed by Module G.

The fourth Vendor Selection & Bid Process module as at Module E preferably comprises Nodes E40, E41, E42, E43, E44, and E45 and basically operates to prequalify subcontractors and/or suppliers based on a number of select parameters, including factors such as past performance evaluations, references, and verifications. The fourth Vendor Selection & Bid Process module further evaluates subcontractor and/or supplier performance indicators, and provides a rating system that operates to reinforce an initial prequalification process.

The fifth Total Cost, Bid Evaluations & Contract Finalization module as at Module F preferably comprises Nodes F50, F51, and F52 and basically operates to compile a total estimated cost of the design project. The fifth Total Cost, Bid Evaluations & Contract Finalization module may further operate to assesses project completion progress, irregularities, exceptions, exclusions, and qualifications; and may further preferably provide functionality for facilitating modifications to the design project.

The sixth Project Assembly & Quality Verification module as at Module G preferably comprises Nodes G80, G81, G82, G83, G84, and G85 and basically operates to activate and govern the physical build of the design project on a select site monitoring in real-time project progress as each support element is injected into the design project. The sixth Project Assembly & Quality Verification module is preferably in further communication with visual monitoring aids, which visual monitoring aids are in communication with peripheral modules for providing constant feedback and project status data for enabling systemic adjustments.

The sixth Project Assembly & Quality Verification module may further preferably operate within a three-dimensional spectrum and provides input control on all three axes of a volumetric space at the select site. The sixth Project Assembly & Quality Verification module may further comprise a series of stages, which series of stages preferably comprise a first project site survey stage, a second GPS three-dimensional project control stage, a third component sequence management stage, a fourth verification of materials and equipment stage, and a fifth component installation stage.

The seventh Financial Accounting & Transactions module or Module H or H100 Node is an Accounts Receivable (AR) and Accounts Payable (AP) Accounting Systems Node as referenced at 100 for managing all financial transactions including accounts payable and accounts receivable in support of the design project. The seventh Financial Accounting & Transactions module may further operate to provide a dynamic purchase log, which dynamic purchase log is comparable to the total cost estimate and amenable in view of final contractual commitments, general condition costs, general requirement costs, change directives, other soft costs, and market conditions. The seventh Financial Accounting & Transactions module may further provide P&L status of select contributing parties to the design project.

While the above descriptions contain much specificity, this specificity should not be construed as limitations on the scope of the invention, but rather as an exemplification of the invention. The foregoing specifications are contemplated to essentially provide a computer-implemented, multi-modular, software-based construction project management system/platform as at 500 for facilitating comprehensive construction project management from conception/design stages 101/102 to build completion stages as at 415.

The construction project management system according to the present invention may be said to comprise or provide a platform to network a series of computers as at 510, which series of computers 510 are in networked communication with one another for implementing a series of non-transitory, computer-implementable, platform-supportive modules as at Modules B-H.

Stated another way, the present invention may be said to provide a non-transitory, computer-implementable construction project management system or platform to network a series of computers and allow the series of computers, as configured in networked communication with one another, to implement a series of platform-supportive modules. The series of platform-supportive modules together cooperate for enabling communication, orchestration, pricing, scheduling, contracting, procuring, delivering, constructing, tracking, and management of an entire construction project build within a system of automation.

Accordingly, although the comprehensive construction project management system and platform according to the present invention have been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A computer-implemented, multi-modular, software-component construction project management system for facilitating comprehensive construction project management from design to build completion stages, the construction project management system comprising:

a software-based platform, the software-based platform being operable to network and support a series of computers, each computer within the series of computers being associated with an input provider of a construction project, the series of computers being in networked communication with one another via the software-based platform and being configured to implement a series of non-transitory, computer-implementable, software-based modular components allowing directional flows of inter-module communication therebetween; and a series of computer-implementable, platform-supportive, software-based modular components, select computer-implementable, platform-supportive, software-based modular components of the series of computer-implementable, platform-supportive, software-based modular components being primarily associated with select input providers of the construction project, the select input providers providing input to the directional flows of inter-module communication from select computers associated with respective input providers, the series of computer-implementable, platform-supportive, software-based modular components comprising:

a first Design Input Conversion & Management software module component, the Design Input Conversion & Management software module component (a) being an entry point portal in unidirectional downflow communication with at least one design data software-based component; (b) receiving digital design data in a first format for a designed project as unidirectionally received from a design provider; (c) performing data conversion of the digital design in the first format into a standardized format for allowing all users to exchange information in the standardized format; and (d) managing initial data traffic, the data conversion providing data formatting for tracking, calculating, managing, and communicating multiple aspects of the construction project for enabling peripheral software-based modular components in networked, inter-module communication with the first Design Input Conversion & Management software module component to recognize design data information in the standardized format to enable peripheral software module components to successfully carry out peripheral component functionality, the peripheral component functionality being embraced by successive functionality provided by at least second through sixth software module components, the second through sixth software module components comprising:

a second Project Survey, Code Match & Organize software module component, the Project Survey, Code Match & Organize software module component being in unidirectional downflow communication with the Design Input Conversion & Management software module component and being configured to code and quantify every material support element to complete the designed project as unidirectionally received from the design provider and converted into the digital design data via the Design Input Conversion & Management software module component, the Design Input Conversion & Management software module component being central between the at least one design data software-based component in up flow communication therewith and the Project Survey, Code Match & Organize software module component in downflow communication therewith;

a third Scheduling software module component, the Scheduling software module component being in unidirectional downflow communication with at least the Project Survey, Code Match & Organize software module component and providing a preliminary schedule for the designed project and updating the preliminary schedule as update data is received by the Scheduling software module component by way of peripheral software module components in communication therewith for providing a final schedule, the Scheduling software module component being central to at least the Project Survey, Code Match & Organize software module component in up flow communication therewith and select peripheral software module components;

a fourth Vendor Selection & Bid Process software module component, the Vendor Selection & Bid Process software module component being in downflow communication with at least the Project Survey, Code Match & Organize software module component and the Scheduling software module component and prequalifying subcontractors and/or suppliers based on a number of select parameters, and managing a bid process, the Vendor Selection & Bid Process software module component being central to at least the Project Survey, Code Match & Organize software module component and the Scheduling software module component in downflow communication therewith and select peripheral software module components;

a fifth Total Cost, Bid Evaluations & Contract Finalization software module component, the Total Cost, Bid Evaluations & Contract Finalization software module component being in unidirectional downflow communication with at least the Project Survey, Code Match & Organize software module component and the Vendor Selection & Bid Process software module component and for compiling a total estimated cost of the designed project, the Total Cost, Bid Evaluations & Contract Finalization software module component being central to at least the Project Survey, Code Match & Organize software module component and the Vendor Selection & Bid Process software module component in downflow communication therewith; and a sixth Project Assembly & Quality Verification software module component, the sixth Project Assembly & Quality Verification software module component being in bidirectional communication with at least the Total Cost, Bid Evaluations & Contract Finalization software module component, the Scheduling software module component; and the Design Input Conversion & Management software module component and activating and governing the physical build of the designed project on a select site monitoring in real-time project progress as each material support element is injected into the designed project.

2. The construction project management system of claim 1 comprising a seventh Financial Accounting & Transactions software module component, the Financial Accounting & Transactions software module component being in unidirectional downflow communication with the Total Cost, Bid Evaluations & Contract Finalization software module component and managing all financial transactions including accounts payable and accounts receivable in support of the designed project.

3. The construction project management system of claim 1 wherein the Project Survey, Code Match & Organize software module component further summarizes material and equipment requirements into a cost estimate summary.

4. The construction project management system of claim 1 wherein the Scheduling software module component tracks project status of the designed project in real time for providing current status of the designed project in comparison to the final schedule.

5. The construction project management system of claim 4 wherein the Scheduling software module component manages procurement processes of the designed project.

6. The construction project management system of claim 5 wherein the Scheduling software module component tracks quantities and types of support elements being provided by each subcontractor and/or supplier to advance the designed project.

7. The construction project management system of claim 1 wherein the Vendor Selection & Bid Process software module component monitors subcontractor and/or supplier performance and provides a rating system that operates to reinforce an initial prequalification process and implements and manages a bid solicitation process.

8. The construction project management system of claim 1 wherein the Total Cost, Bid Evaluations & Contract Finalization software module component assesses project completion progress, irregularities, exceptions, exclusions, and qualifications.

9. The construction project management system of claim 8 wherein the Total Cost, Bid Evaluations & Contract Finalization software module component provides functionality for facilitating modifications to the designed project.

10. The construction project management system of claim 1 wherein the Project Assembly & Quality Verification software module component is in communication with visual monitoring aids, the visual monitoring aids being in communication with peripheral modules for providing constant feedback and project status data for enabling systemic adjustments.

11. The construction project management system of claim 10 wherein the Project Assembly & Quality Verification software module component operates within a three-dimensional spectrum and provides input control on all three axes of a volumetric space at the select site.

12. The construction project management system of claim 11 wherein the Project Assembly & Quality Verification software module component comprises a series of stages, the series of stages comprising a first project site survey stage, a second GPS three-dimensional project control stage, a third component sequence management stage, a fourth verification of materials and equipment stage, and a fifth component installation stage.

13. The construction project management system of claim 2 wherein the Financial Accounting & Transactions software module component provides a dynamic purchase log, the dynamic purchase log being comparable to the total cost estimate and amenable in view of final contractual commitments, general condition costs, general requirement costs, change directives, other soft costs, and market conditions.

14. The construction project management system of claim 2 wherein the Financial Accounting & Transactions software module component provides P&L status of select contributing parties to the designed project.

15. A non-transitory, computer-implementable, software-based construction project management system, the construction project management system being operable within a computer network environment and providing a software-based platform to network and support a series of computers, each computer within the series of computers being associated with an input provider of a construction project, the series of computers being in networked communication with one another for implementing a series of platform-supportive, software-based module components allowing directional flows of inter-module communication therebetween;

the series of platform-supportive, software-based module components being in inter-modular-communication such that:

a first entry point portal software module component is in unidirectional downflow communication with at least one design data software-based component for (a) receiving digital design data in a first format therefrom; and (b) performing data conversion of initial design data into a standardized format, the data conversion providing data formatting for tracking, calculating, managing, and communicating multiple aspects of the construction project to peripheral software module components for enabling the peripheral software components to recognize design data information in the standardized format and to successfully carry out peripheral component functionality, the peripheral component functionality being embraced by successive functionality provided by at least second through sixth software module components, the second through sixth software module components comprising:

a second software module component is in downflow communication with the first software module component coding and quantifying every material support element to complete the designed project;

a third software module component is in downflow communication with at least the second software module component for providing a preliminary schedule for the designed project and updating the preliminary schedule as update data is received by the third software module component by way of peripheral software module components in communication therewith;

a fourth software module component is in downflow communication with at least the second and third software module components for prequalifying subcontractors and/or suppliers based on a number of select parameters, and managing a bid process;

a fifth software module component is in downflow communication with at least the second and fourth software module components for compiling a total estimated cost of the designed project; and a sixth software module component is in bidirectional communication with at least the first, third, and fifth software module components activating and governing the physical build of the designed project on a select site monitoring in real-time project progress as each material support element is injected into the designed project;

the series of platform-supportive, software-based module components together being cooperable for enabling communication, orchestration, pricing, scheduling, contracting, procuring, delivering, constructing, tracking, and management of an entire construction project build within a system of automation.

16. The construction project management system of claim 15 wherein the first software module component comprises a data conversion system, the data conversion system for supporting implementation, governance, and completion of the construction project.

17. The construction project management system of claim 15 wherein the series of platform-supportive, software-based module components are configured to be cooperable with peripheral fields of art so as to embrace and adjust to technological advances in the peripheral fields of art and accordingly update the construction project management system so as to enhance the functionality thereof.

18. The construction project management system of claim 17 wherein select platform-supportive, software-based module components of the series of platform-supportive, software-based module components are configured to enhance peripheral fields of art by communicating therewith in a bi-directional manner.

19. The construction project management system of claim 15 comprising, in combination, a vendor system, the vendor system comprising a series of non-transitory, computer-implementable, software-based module components substantially similar to those of the construction project management system with variations for enhancing vendor contributions thereto.

20. A non-transitory, computer-implementable, software-based construction project management platform operable within a computer network environment for implementing a series of platform-supportive, software-based module components, the series of platform-supportive, software-based module components being in inter-modular communication such that:

a first entry point portal software module component is in unidirectional downflow communication with at least one design data software-based component for (a) receiving digital design data in a first format therefrom; and (b) performing data conversion of initial design data into a standardized format, the data conversion providing data formatting for tracking, calculating, managing, and communicating multiple aspects of a construction project to peripheral software module components for enabling the peripheral software components to recognize design data information in the standardized format and to successfully carry out peripheral component functionality, the peripheral component functionality being embraced by successive functionality provided by at least second through sixth software module components, the second through sixth software module components comprising:

a second software module component is in downflow communication with the first software module component for coding and quantifying every material support element to complete the designed project;

a third software module component is in downflow communication with at least the second software module component for providing a preliminary schedule for the designed project and updating the preliminary schedule as update data is received by the third software module component by way of peripheral software module components in communication therewith;

a fourth software module component is in downflow communication with at least the second and third software module components for prequalifying subcontractors and/or suppliers based on a number of select parameters, and managing a bid process;

a fifth software module component is in downflow communication with at least the second and fourth software module components for compiling a total estimated cost of the designed project; and a sixth software module component is in bidirectional communication with at least the first, third, and fifth software module components for activating and governing the physical build of the designed project on a select site monitoring in real-time project progress as each material support element is injected into the designed project;

the series of platform-supportive, software-based module components together being cooperable for managing an entire construction project build from design input through to final build within a system of automation.

\* \* \* \* \*